(12) United States Patent
Lin et al.

(10) Patent No.: US 8,539,387 B1
(45) Date of Patent: Sep. 17, 2013

(54) USING BEAT COMBINATIONS FOR CONTROLLING ELECTRONIC DEVICES

(71) Applicant: Google Inc., Mountain View, CA (US)

(72) Inventors: Hsing-Sheng Lin, Taipei (TW); Shyh-In Joseph Hwang, Taoyuan (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/657,103

(22) Filed: Oct. 22, 2012

(51) Int. Cl.
G06F 3/033 (2013.01)
G06F 3/048 (2013.01)

(52) U.S. Cl.
USPC .......................................... 715/863; 715/856

(58) Field of Classification Search
USPC ................. 715/863, 856
See application file for complete search history.

(56) References Cited

U.S. PATENT DOCUMENTS

| | | | |
|---|---|---|---|
| 7,395,506 B2 * | 7/2008 | Tan et al. | 715/741 |
| 7,479,949 B2 * | 1/2009 | Jobs et al. | 345/173 |
| 7,480,870 B2 * | 1/2009 | Anzures et al. | 715/772 |
| 7,870,508 B1 * | 1/2011 | Wright et al. | 715/853 |
| 7,956,847 B2 * | 6/2011 | Christie | 345/173 |
| 8,127,254 B2 | 2/2012 | Lindberg et al. | |
| 8,209,637 B2 * | 6/2012 | Chaudhri et al. | 715/863 |
| 8,335,996 B2 * | 12/2012 | Davidson et al. | 715/800 |
| 8,375,336 B2 * | 2/2013 | Matthews et al. | 715/863 |
| 8,423,916 B2 * | 4/2013 | Chihara et al. | 715/863 |
| 8,428,430 B2 * | 4/2013 | Kondo et al. | 386/241 |
| 8,451,248 B1 * | 5/2013 | Kim | 345/173 |
| 8,464,181 B1 * | 6/2013 | Bailiang et al. | 715/848 |
| 8,473,870 B2 * | 6/2013 | Hinckley et al. | 715/863 |
| 2003/0081009 A1 * | 5/2003 | Seo | 345/812 |
| 2008/0122796 A1 * | 5/2008 | Jobs et al. | 345/173 |
| 2010/0248689 A1 | 9/2010 | Teng et al. | |
| 2011/0102464 A1 * | 5/2011 | Godavari | 345/650 |
| 2012/0007836 A1 | 1/2012 | Wu et al. | |

\* cited by examiner

*Primary Examiner* — David Phantana Angkool
(74) *Attorney, Agent, or Firm* — McDonnell Boehnen Hulbert & Berghoff LLP

(57) ABSTRACT

Beat combinations may be used in controlling operations or functions of a handheld electronic device. The beat combinations may be applied via a presence-sensitive interface in the handheld electronic device. The presence-sensitive interface may be implemented using a display or screen of the handheld electronic device. The beat combinations may comprise a series of tap steps, with each tap step comprising an arbitrary tap location, and having specific tap criteria (e.g., number of taps and/or duration of each of the taps.). The beat combinations may also comprise tap-and-slide combinations, involving an initial tap location, which may be an arbitrary location in the presence-sensitive interface, followed by a sequence of preconfigured slides, having preconfigured slide movements, to other tapping locations. The beat combinations may allow for acceptable tolerances associated with each of tap steps (e.g., allowing for acceptable variation of location, tap criteria, and/or slide movements).

28 Claims, 7 Drawing Sheets

USING BEAT COMBINATIONS FOR CONTROLLING ELECTRONIC DEVICES

TECHNICAL FIELD

Aspects of the present application relate to electronic devices. More specifically, certain implementations of the present disclosure relate to using beat combinations for controlling electronic devices.

BACKGROUND

Various types of electronic devices are now commonly utilized. In this regard, electronic devices may include mobile and non-mobile devices, communication (wired and/or wireless) and non-communication devices, and/or general purpose and special purpose devices. Examples of electronic devices may comprise handheld mobile devices (e.g., cellular phones, smartphones, and/or tablets), computers (e.g., laptops, desktop or personal computers, and/or servers), dedicated multimedia devices (e.g., televisions, DVD or Blu-ray players, etc.), and/or other similar devices. In many instances, electronic devices may be utilized by one or more users, for various purposes, including for business and/or personal use. As a result, in many instances electronic devices may contain confidential, valuable and/or personal information. For example, users may use smartphones and/or tablets for shopping, planning and/or scheduling personal and/or professional appointments, conducting financial transactions (e.g., banking), and/or conducting business or other professional interactions (e.g., emails). Therefore, guarding against unwanted access to electronic devices is becoming more and more important, and use of reliable access mechanisms may be desired.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for using beat combinations for controlling electronic devices, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Figure 1A:
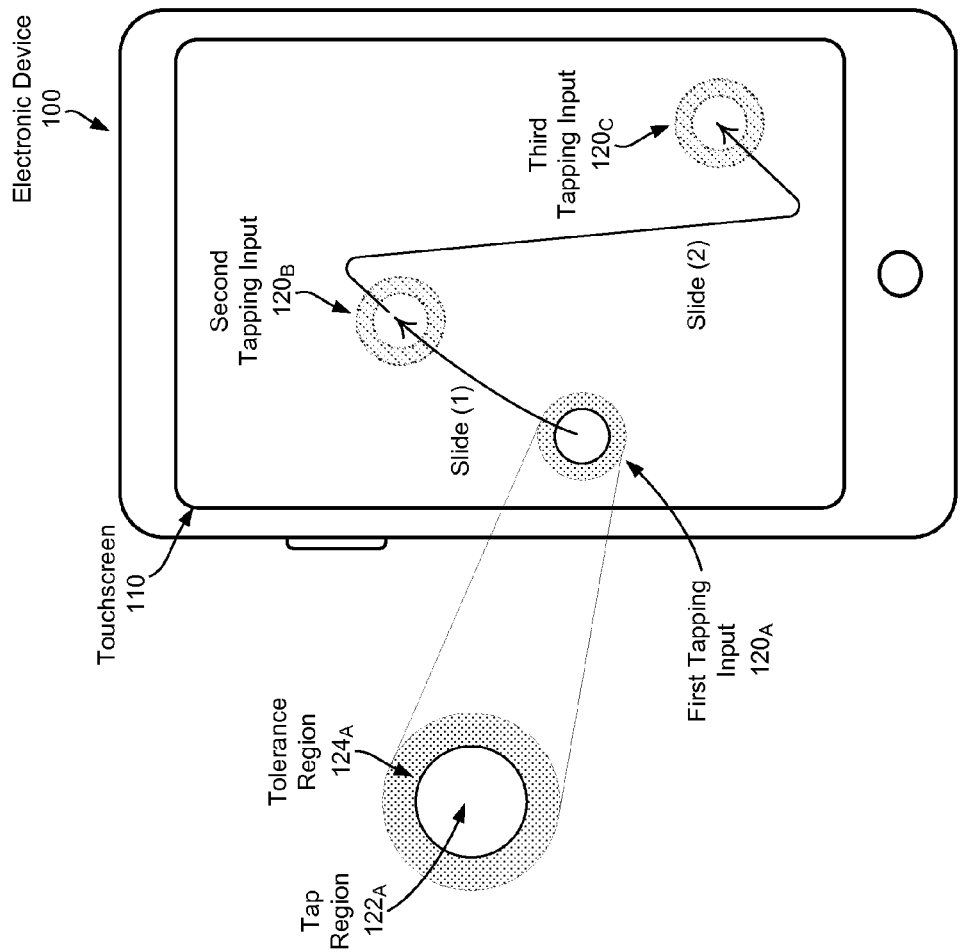
FIG. 1A is an illustration of an electronic device that may support use of a beat combination, comprising a combination of tapping inputs with slides, to control access and/or use of the electronic device.

The present disclosure relates to a method and system for using beat combinations for controlling electronic devices. In various implementations, in an electronic device may implement access functions, which may enable determining when to allow control of operations of the electronic device (e.g., accessing it and/or triggering actions there) based on interactions of a user with a presence-sensitive interface (e.g., touch input interface) in the electronic device. In this regard, determining when to allow access of the electronic device or trigger actions therein may comprise receiving at a random location in the presence-sensitive interface, a first tapping input having particular tapping pattern; receiving one or more subsequent tapping inputs at corresponding one or more other locations in the presence-sensitive interface, with each subsequent tapping input having a corresponding particular tapping pattern; and determining user actions between consecutive tapping inputs. Each tapping pattern may comprise a number of taps, with each tap having a particular tap duration, and pauses between consecutive taps. The controlled operations of the electronic device comprise one or more of locking or unlocking of the electronic device, triggering particular action, initiating or terminating applications, and/or sending of a particular communication. The user actions between consecutive tapping inputs may comprise one or more of pauses, slides and/or jumps to locations in the presence-sensitive interface.

The received first tapping input, the one or more subsequent tapping inputs, and/or the user actions inbetween inputs, may be compared with a preconfigured access profile associated with the user. In this regard, the access profile may comprise a number of expected tapping inputs, expected user actions between each consecutive tapping inputs, and an expected tapping pattern associated with each expected tapping input. Each expected tapping pattern may comprise a particular number of taps, with each tap having a predefined tap duration, and predefined pauses between consecutive taps. The access profile may be configured and/or modified based on user input. The user actions may be compared with corresponding predefined actions in the access profile between consecutive tapping inputs. Comparisons with the preconfigured user profile may allow and/or account for predefined acceptable variations, such as with respect to duration and/or location of each tap, pauses between consecutive taps, and/or actions between consecutive tapping inputs. The one or more of the predefined acceptable variations may be set and/or adjusted based on user input.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "e.g.," introduces a list of one or more non-limiting examples, instances, or illustrations.

FIG. 1A is an illustration of an electronic device that may support use of a beat combination, comprising a combination of tapping inputs with slides, to control access and/or use of the electronic device. Referring to FIG. 1A, there is shown an electronic device 100.

The electronic device 100 may comprise suitable circuitry, interfaces, logic, and/or code that may be operable to perform various functions or operations, and/or run various applications and/or programs. In this regard, operations, functions, applications and/or programs supported by the electronic device 100 may be performed, executed and/or run based on user instructions and/or pre-configured instructions. In some instances, the electronic device 100 may enable communication of data or messages, such as via wired and/or wireless connections configured in accordance with one or more supported wireless and/or wired protocols or standards. Examples of electronic devices may comprise handheld mobile devices (e.g., cellular phones, smartphones, and/or tablets), computers (e.g., laptops, desktop or personal computers, and/or servers), dedicated multimedia devices (e.g., televisions, DVD or Blu-ray players, etc.), and/or other similar devices. The disclosure, however, is not limited to any particular type of electronic device. In some instances, the electronic device 100 may incorporate components or subsystems for generating and/or obtaining certain information. For example, the electronic device 100 may comprise sensors for obtaining and/or generating data relating to, for example, the device location, environment, and the like. The communication device 100 may also comprise dedicated components enabling interactions with users, such as obtaining user input and/or providing user output.

In operation, the electronic device 100 may be configured to support secure or controlled access. In this regard, in some instances it may be desirable to control access to the electronic device 100, such as when the electronic device 100 contains (or it may allow access to) confidential, valuable and/or personal information, and/or may comprise functions or applications that authorized device user may not want others to be able to use or access. For example, users of the electronic device 100 may use it for shopping, planning and/or scheduling personal and/or professional appointments, conducting financial transactions, and/or conducting business or other professional interactions (e.g., emails). Accordingly, the electronic device 100 may be configured to incorporate secure access functions, which may be used to control access to and/or use of the electronic device 100, application(s) or function(s) available therein, and/or data (e.g., confidential information) accessible and/or utilized via the electronic device 100. The secure access functions may be based on user input or interaction with the electronic device 100, and may be used, for example, in locking/unlocking the electronic device 100 (to prevent or allow access to the device), and/or to trigger actions in the device (e.g., launching or executing particular applications).

In various implementations, controlling access to the electronic device 100 may be based on what may be termed as a "beat combination" or "beat combinations." In this regard, beat combinations may comprise particular series of actions or inputs that may be provided by the device user, to enable reliably authenticating or validating the user attempting to gain access to the electronic device, such as by comparing it with a corresponding previously defined "authentication" pattern. In other words, access to the electronic device 100 (or any data, applications, functions available therein) may be allowed only when the user applies a beat combination that matches a previously configured or defined expected beat combination. The beat combinations may be based on, for example, a special sequence of tapping and/or slides, which may be applied via a presence-sensitive interface, which comprise a touch input interface (e.g., a touchscreen 110 in the electronic device 100) or any other similar components or auxiliary devices that may allow entering user input by means of a touch or other presence criteria, with certain tempo (e.g., certain inter-arrival times of underlying sub-gestures) using the touch input interface. For example, in some instances beat combinations may comprise one or more tapping inputs. In this regard, each tapping input may comprise one or more taps, with each having a particular duration (e.g., for maintaining contact with the touchscreen 110), with particular actions occurring between the taps and/or between tapping inputs, and with each action having particular corresponding duration. In this regard, the actions may comprise, for example, slides (e.g., from position of current tap or tapping input to the position of the subsequent tap or tapping input, with each slide possibly having a particular manner of movement or motion), jumps (from a position of a current tap or tapping input to a position of a subsequent tap or tapping input), pauses (each with particular duration), and/or any combination thereof. The tapping input may be one-finger based—i.e., with the user using a single finger in performing the taps and/or various actions (e.g., slides) performed during the tapping input. In other instances, however, tapping input may be multi-finger based—i.e., with the user using multiple fingers in performing the taps and/or various actions (e.g., slides). For example, an input pattern could be a two-finger tap followed by 3 consecutive one-finger taps; or an input pattern could be one finger keeps touching the device while another finger making a number of taps/slides at some predefined locations.

For example, as shown in FIG. 1A, a beat combination may comprise three tapping inputs $120_A$, $120_B$, and $120_C$, with each of these tapping inputs comprising a particular number of taps (which may be different from one input to another), with each tap having a particular expected duration (that may differ from tap to tap), and with pauses between each two consecutive taps (which may differ from pause to pause). The first tapping input $120_A$ may be applied at a random or an arbitrary position in the touchscreen 110. The beat combination may comprise slides as expected actions between the tapping inputs. In this regard, the expected slide(s) may be of a particular manner of movement or motion (e.g., the first slide, from first tapping input $120_A$ to second tapping input $120_B$, may be a single movement while the second slide, from second tapping input $120_B$ to third tapping input 120, may be expected to be a three-part movement as shown in FIG. 1A). Because it may be hard for users to apply taps within each tapping input at exactly the same position, a measure of deviation may be allowed when applying the tapping input. For example, for the first tapping input $120_A$, a tap region $122_A$ may be defined, based on where the first tap is applied, but then a tolerance region $124_A$ may be defined, such that subsequent taps may be deemed valid if they are applied within the expanded touchscreen region combining both. In other words, if a tap is applied, in full or in part, outside tap region $122_A$ but still within tap region $124_A$, then it may still be deemed valid).

In some instances the expected beat combination may comprise a single-beat combination—i.e., having a single tempo. For example, where each of the tapping inputs $120_A$, $120_B$, and $120_C$ comprise a single tap, the beat combination may be reduced to a single-beat combination—i.e., having a single tapping pattern, with only three taps, and with slides between the three taps.

In some instances, electronic devices, such as the electronic device 100 may support use of feedback during configuration or application of beat combinations. In this regard, feedback may be used to indicate the outcome of applying a beat combination (e.g., indicate success or error), and/or may be used in playing back user input, such as when configuring a beat combination that would subsequently be used as an expected pattern. Various means may be used in providing feedback with respect to configuring and/or applying beat combinations, such as audio (e.g., playing sounds for taps, pauses, slides, and/or jumps), vibration(s), images (e.g., tap positions) or video (e.g., visually showing slide movements, or visually replaying the whole pattern), and/or LED lights.

Figure 1B:
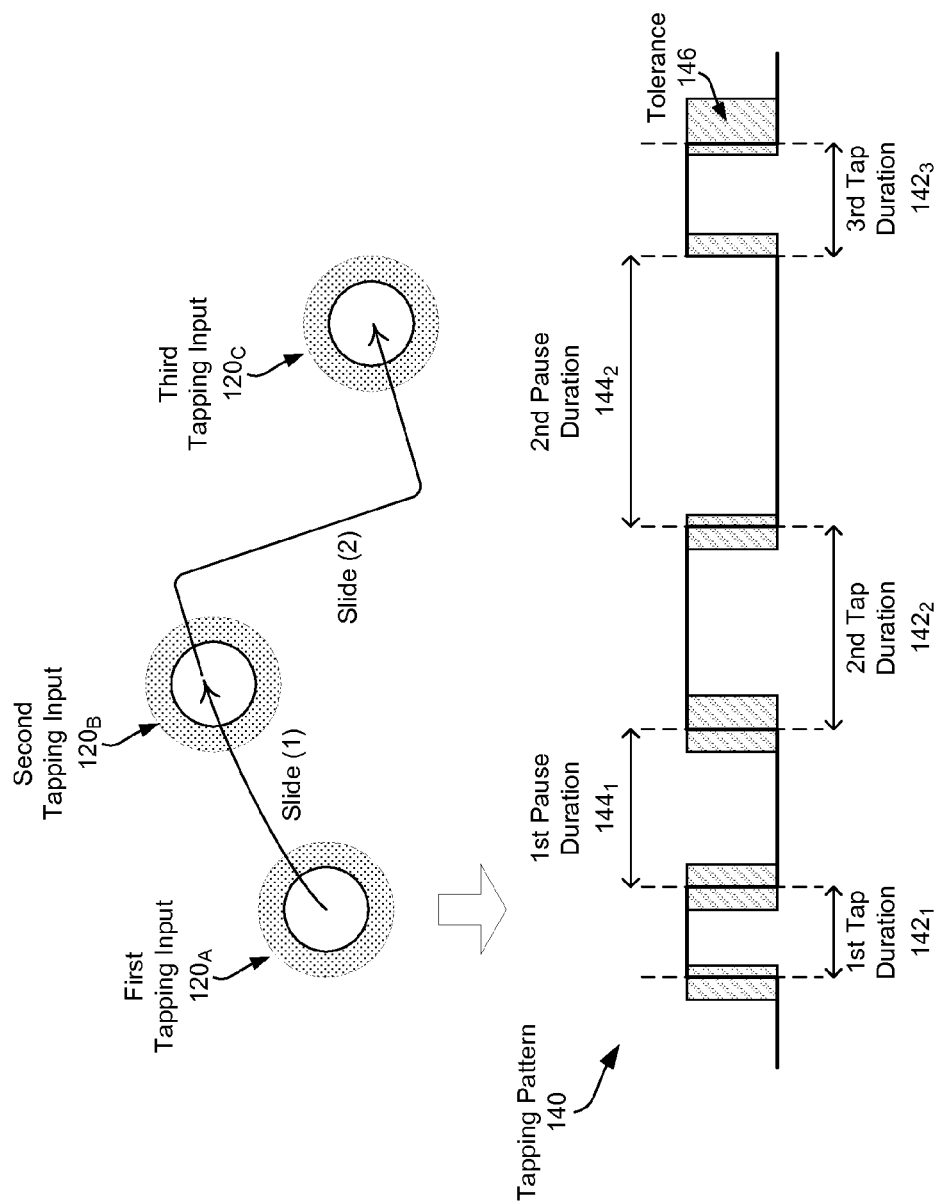
FIG. 1B is a timing diagram for a tapping pattern that includes plurality of taps with pauses therebetween that may be used as part of a beat combination, to control access and/or use of an electronic device.

FIG. 1B is a timing diagram for a tapping pattern that includes plurality of taps with pauses therebetween that may be used as part of a beat combination, to control access and/or use of an electronic device. Referring to FIG. 1B, there is shown a timing diagram corresponding to a tapping pattern 140. In this regard, the tapping pattern 140 may corresponding to one of the tapping inputs of FIG. 1B, such as the first tapping input $120_A$ for example. Alternatively, the timing diagram may correspond to the whole beat combination (e.g., when it is a single-beat combination).

The tapping pattern 140 may comprise, for example, three taps $142_1$, $142_2$, and $142_3$, separated by two pauses $144_2$ and $144_2$. Each of the taps ($142_1$, $142_2$, and $142_3$) and the pauses ($144_2$ and $144_2$) may have a particular duration. In this regard, the tap durations for taps $142_1$, $142_2$, and $142_3$ may correspond to the time the user maintains contact with the touch input interface (e.g., touchscreen 110); whereas the durations of the pauses $144_1$ and $144_2$ may correspond to the time the user beaks contact with the touch input interface. In some instances, the tapping pattern may incorporate predefined tolerances 146. In this regard, the tolerances 146 may pertain to when taps may be applied or ended. Furthermore, the tolerances 146 may vary—i.e., may have different durations (as shown in FIG. 1B). The use of tolerances 146 may allow for a measure of imprecision as to when the taps are applied, how long the taps are maintained (tap durations), and/or durations of actions between taps (e.g., pauses or slide durations).

Figure 2A:
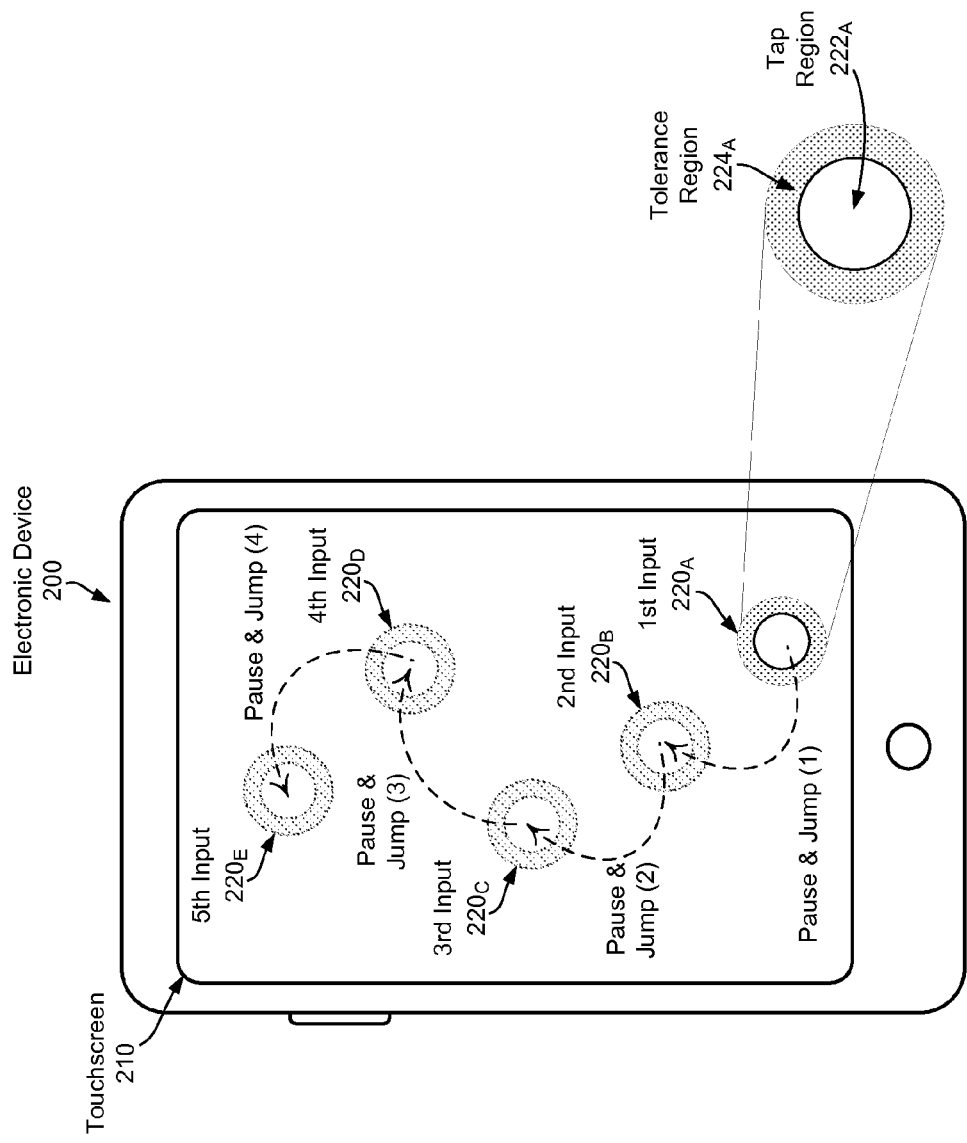
FIG. 2A is an illustration of an electronic device that may support use of a beat combination, comprising a combination of tapping inputs with jumps and pauses, to control access and/or use of the electronic device.

FIG. 2A is an illustration of an electronic device that may support use of a beat combination, comprising a combination of tapping inputs with jumps and pauses, to control access and/or use of the electronic device. Referring to FIG. 2A there is shown an electronic device 200, which may be substantially similar to the electronic device 100, as described with respect to FIG. 1, for example.

In operation, the electronic device 200 may be configured to incorporate secure access functions, which may be used to control access to and/or use of the electronic device 100, application(s) or function(s) available therein, and/or data (e.g., confidential information) accessible and/or utilized via the electronic device 200, and/or to perform particular actions in the electronic device 200. For example, the secure access functions may allow for the unlocking of the electronic device 200, and/or the starting or executing of particular applications in the electronic device 200. The secure access function implemented via the electronic device 200 may be based on beat combinations, which may be applied via a touch input interface (e.g., a touchscreen 210), substantially as described with respect to FIG. 1A for example. For example, as shown in FIG. 2A, a beat combination may comprise five tapping inputs $220_A$, $220_B$, $220_C$, $220_D$, and $220_E$, with each of these tapping inputs comprising a particular number of taps (which may be different from one input to another), with each tap having particular expected duration (which may differ from tap to tap), and with pauses between each two consecutive taps (which may differ from pause to pause). In some instances, one or more of the five tapping inputs $220_A$, $220_B$, $220_C$, $220_D$, and $220_E$ may be applied at a random or an arbitrary position in the touchscreen 210. The beat combination may comprise jumps as expected actions between the tapping inputs. In this regard, each of the expected jumps may have particular duration. Furthermore, because it may be difficult for users to apply taps within each tapping input at exactly the same position, a measure of deviation may be allowed when applying the tapping input. For example, a tap region $222_A$ may define where taps are expected to be applied, but then a tolerance region $224_A$ may be defined, such that taps may be deemed valid if they are applied within the expanded touchscreen region combining both. In other words, if a tap is applied, in full or in part, outside tap region $222_A$ but still within tap tolerance region $224_A$, then it may still be deemed valid).

In some instance, the electronic device 200 may comprise and/or support multiple inputs (e.g., by comprising multiple touch input interfaces), which may enable receiving and/or handling multiple beat inputs simultaneously. For example, in some instances, at least some of the tapping inputs $220_A$-$220_E$ may be applied at the same time when the electronic device 200 may incorporate a multiple input capability.

Figure 2B:
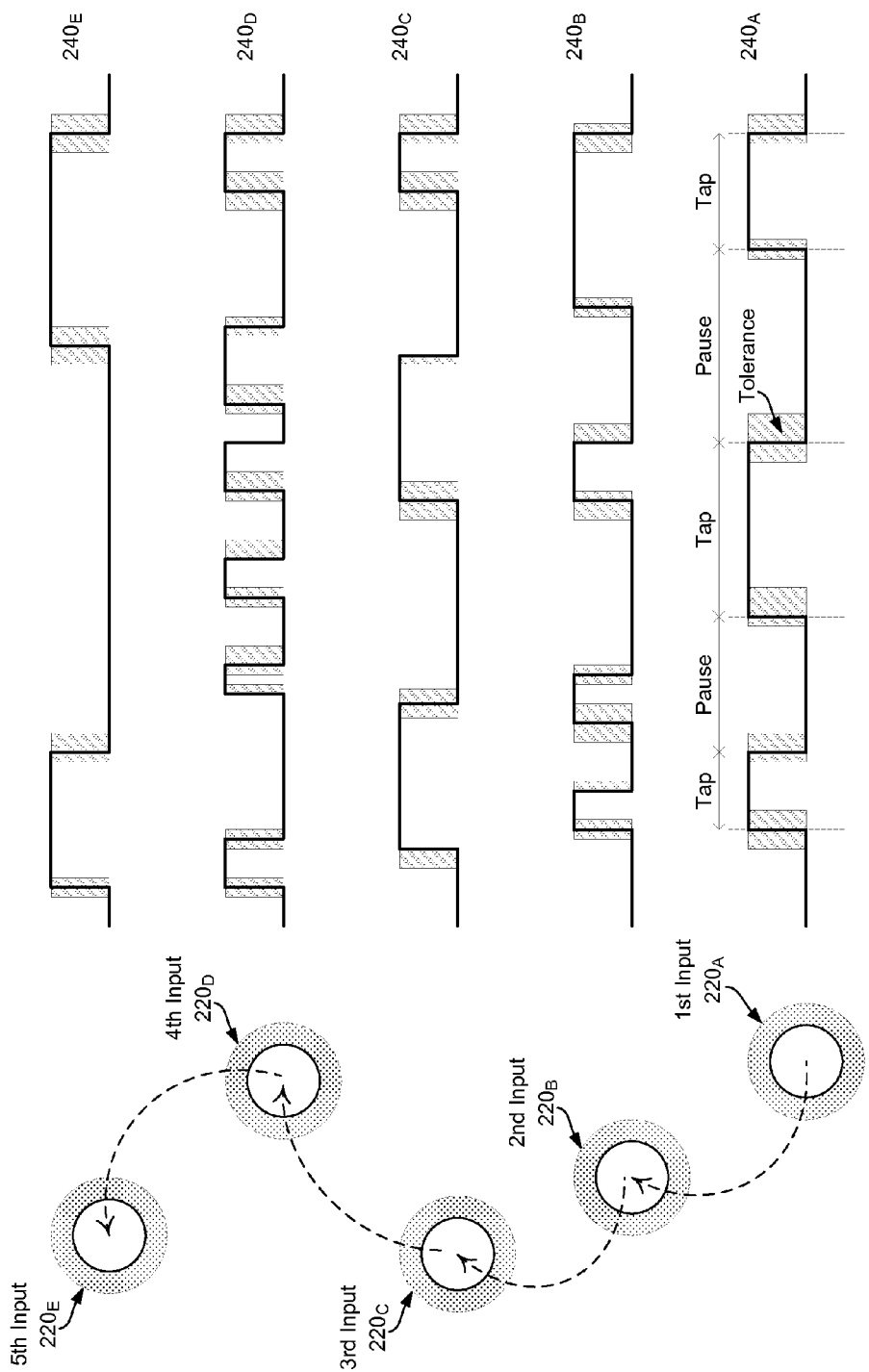
FIG. 2B is a timing diagram illustrating use of a beat combination, comprising a combination of tapping inputs with jumps and pauses, to control access and/or use of an electronic device.

FIG. 2B is a timing diagram illustrating use of a beat combination, comprising a combination of tapping inputs with jumps and pauses, to control access and/or use of an electronic device. Referring to FIG. 2B, there is shown a timing diagrams corresponding to plurality of tapping patterns $240_A$, $240_B$, $240_C$, 240, and $240_E$. In this regard, each of the tapping patterns $240_A$, $240_B$, $240_C$, $240_D$, and $240_E$ may corresponding to one of the tapping inputs $220_A$, $220_B$, $220_C$, $220_D$, and $220_E$ of FIG. 1B.

Each of the tapping patterns $240_A$, $240_8$, $240_C$, $240_D$, and $240_E$ may comprise a plurality of taps, with particular actions (e.g., pauses) between the taps. For example, the tapping pattern $240_A$ may comprise, for example, three taps separated by two pauses. Each of the taps and the pauses of tapping pattern $240_A$ may have particular duration. Furthermore, the tapping pattern $240_A$ may incorporate predefined tolerances, which may apply to taps (tap start and/or tap end), and/or to pauses between the taps. The remaining tapping patterns $240_B$, $240_C$, $240_D$, and $240_E$ may be substantially similar, but the number of the taps and the durations of the taps or pauses between the taps may differ, in order to ensure that each of the tapping patterns $240_A$, $240_B$, $240_C$, $240_D$, and $240_E$ may have a unique beat (e.g., tempo). Furthermore, the tolerances applicable to the tapping patterns $240_A$, $240_8$, $240_C$, $240_D$, and $240_E$ may vary—i.e., may have different durations (as shown in FIG. 2B).

Figure 3:
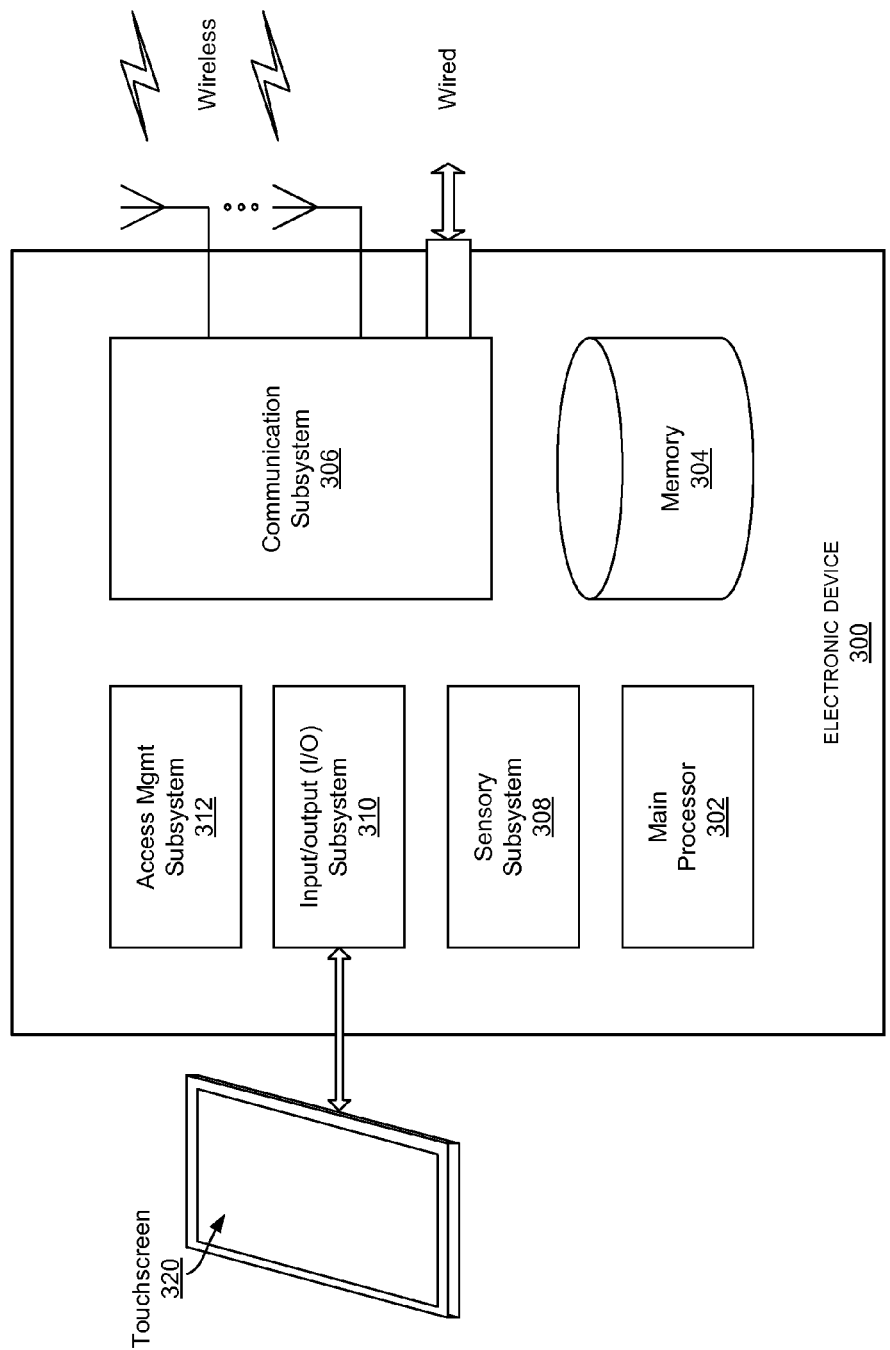
FIG. 3 is a block diagram illustrating an electronic device that supports use of beat combinations for controlling access and/or use of the electronic device.

FIG. 3 is a block diagram illustrating an electronic device that supports use of beat combinations for controlling access and/or use of the electronic device. Referring to FIG. 3, there is shown an electronic device 300.

The electronic device 300 may comprise suitable circuitry, interfaces, logic, and/or code that may be operable to implement various aspects of the disclosure. In this regard, the electronic device 300 may correspond to the electronic devices 100 and 200 of FIGS. 1A and 2A, respectively, for example. The electronic device 300 may comprise, for example, a main processor 302, a system memory 304, a communication subsystem 306, a sensory subsystem 308, an input/output (I/O) subsystem 310, and an access management subsystem 312.

The main processor 302 may comprise suitable circuitry, interfaces, logic, and/or code that may be operable to process data, and/or control and/or manage operations of the electronic device 300, and/or tasks and/or applications performed therein. In this regard, the main processor 302 may configure and/or control operations of various components and/or subsystems of the electronic device 300, by utilizing, for example, one or more control signals. The main processor 302 may enable the running and/or execution of applications, programs and/or code, which may be stored, for example, in the system memory 304. Alternatively, one or more dedicated application processors may be utilized for running and/or executing applications (or programs) in the electronic device 300.

The system memory 304 may comprise suitable circuitry, interfaces, logic, and/or code that may enable permanent and/or non-permanent storage, buffering, and/or fetching of data, code and/or other information, which may be used, consumed, and/or processed. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The communication subsystem 306 may comprise suitable circuitry, interfaces, logic, and/or code operable to communicate data from and/or to the electronic device, such as via one or more wired and/or wireless connections. The communication subsystem 306 may be configured to support one or more wired protocols (e.g. Ethernet standards) and/or wireless protocols or interfaces (e.g., Bluetooth, WiFi, cellular, WiMAX, and/or any available wireless protocol/interface), facilitating transmission and/or reception of signals to and/or from the electronic device 300, and/or processing of transmitted or received signals in accordance with applicable wired or wireless protocols. In this regard, signal processing operations may comprise, for example, filtering, amplification, analog-to-digital conversion and/or digital-to-analog conversion, up-conversion/down-conversion of baseband signals, encoding/decoding, encryption/decryption, and/or modulation/demodulation.

The sensory subsystem 308 may comprise suitable circuitry, interfaces, logic, and/or code for obtaining and/or generating sensory information, which may relate to the electronic device 300, its user(s), and/or its environment. For example, the sensory subsystem 308 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 310 may comprise suitable circuitry, interfaces, logic, and/or code for enabling and/or managing user interactions with the electronic device 300, such as obtaining input from, and/or to providing output to, the device user(s). The I/O subsystem 310 may support various types of inputs and/or outputs, including, for example, video, audio, and/or text. In this regard, dedicated I/O devices and/or components, external to or integrated within the electronic device 300, may be utilized for inputting and/or outputting data during operations of the I/O subsystem 310. Examples of such dedicated I/O devices may comprise displays, mice, keyboards, touch screens (or touch pads), and the like. For example, the I/O subsystem 310 may comprise a touchscreen 320, which may be used, among other things, in conjunction with beat combination based secure access function(s) for example.

The access management subsystem 312 may comprise suitable logic, circuitry, interfaces, and/or code for managing access operations in the electronic device 300. The access management subsystem 312 may be operable to perform user authentication in the electronic device 300. In this regard, user authentication may be directed at authenticating users associated with the electronic device 300 and/or authenticating actions by the users, such as when users attempt to unlock the electronic device 300 and/or run particular applications or functions therein. The access management subsystem 312 may be operable to obtain user related information or input pertinent to authentication of users via the sensory subsystem 308 and/or the I/O subsystem 310.

In some implementations, the access management subsystem 312 may be configured to support use of beat combination based access functions, substantially as described with respect to the previous figures (i.e., FIGS. 1A, 1B, 2A, and/or 2B) for example, and/or of dynamic and/or adaptive control of these beat combinations based access functions. For example, the access management subsystem 312 may allow for configuring and/or modifying user access profiles, which may comprise predefined (expected) beat combinations that may subsequently be used in authorizing user access of the electronic device 300 and/or in triggering of actions therein. For example, particular beat patterns may be entered (e.g., via the touchscreen 320), and may be set as expected beat combinations, and/or associated with particular user access profile, for use in subsequent access functions. Thus, when a user attempts to gain access to the electronic device 300 and/or trigger actions therein, a beat combination entered by the user may be compared, via the access management subsystem 312, with the previously configured beat combination. In instances where the entered beat combination sufficiently matches the previously configured beat combination, access may be granted (e.g., device is unlocked) and/or specified actions(s) may be triggered.

Figure 4A:
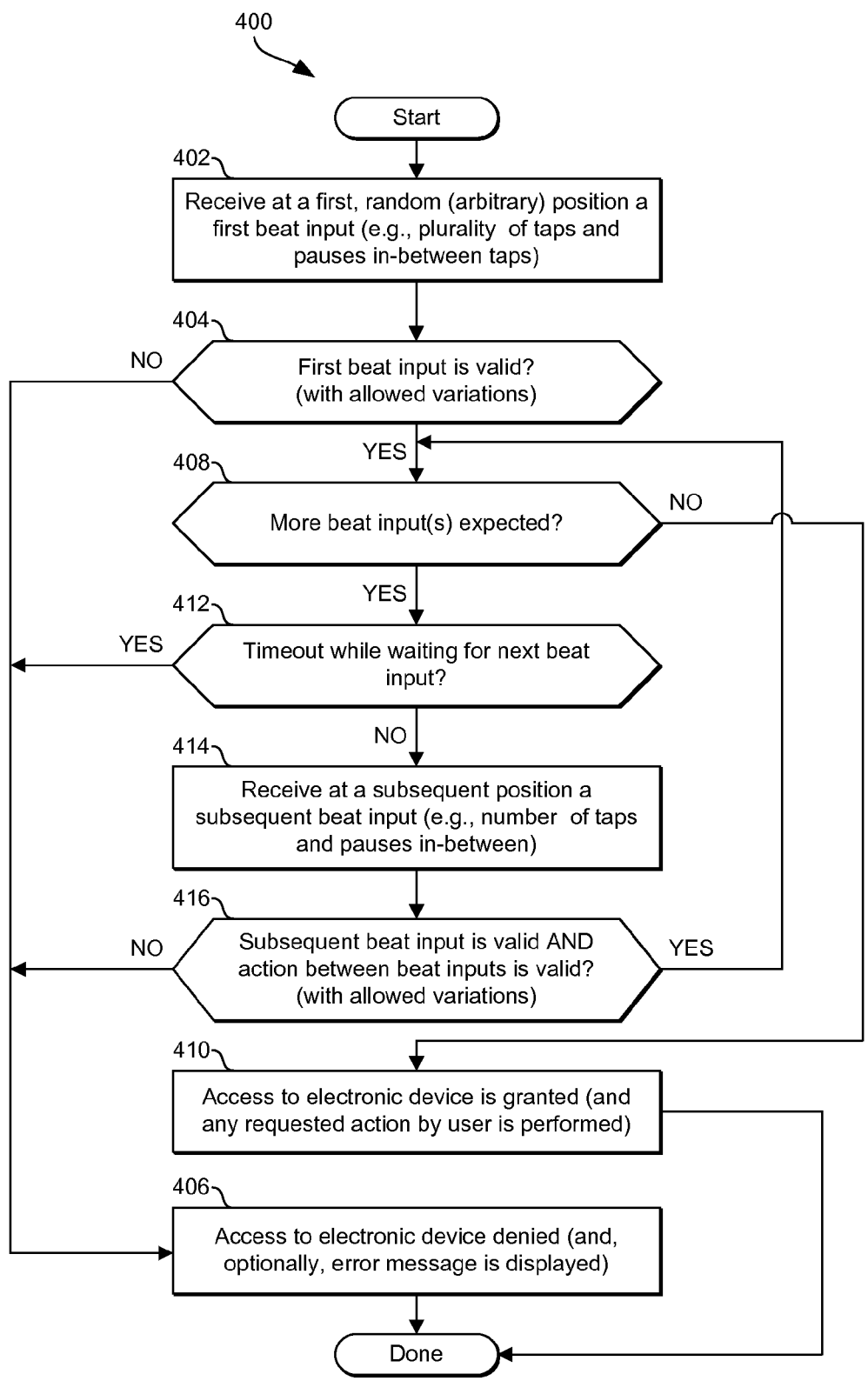
FIG. 4A is a flow chart illustrating use of beat combinations for controlling access and/or use of an electronic device.

FIG. 4A is a flow chart illustrating use of beat combinations for controlling access and/or use of an electronic device. Referring to FIG. 4A, there is shown a flow chart 400 comprising a plurality of example steps for controlling access to and/or use of an electronic device (e.g., device 300) based on beat combinations.

In step 402, the electronic device may receive at a first, random (arbitrary) position a first beat input (e.g., one or more taps and particular actions, such as pauses, between the taps). In step 404, it may be determined whether the first beat combination is valid. In this regard, the determination may be made based on comparing the entered beat combination with a corresponding, previously configured "authentication" beat combination. The comparison may allow for a certain measure of variation, such as with respect to tap position, tap durations, and/or duration of any actions performed (or expected) between taps or tapping inputs. In instances where it is determined that the first beat combination is not sufficiently valid, the process may proceed to step 406. In step 406, access to electronic device denied and/or expected actions are not triggered (and, optionally, an error message is displayed).

Returning to step 404, in instances where it is determined that the first beat combination is sufficiently valid, the process may proceed to step 408. In step 408, it may be determined whether more beat combinations are expected. In instances where there are no more beat combinations, the process may proceed to step 410. In step 410, access to the electronic device may be granted (and/or any requested action by user is performed). Returning to step 408, in instances where it is determined that there may be more beat combinations expected, the process may proceed to step 412. In step 412, it is determined whether a timeout occurred while waiting for a subsequent, expected beat combination. In instances where a timeout occurs, the process may proceed to step 406, otherwise the process may proceed to step 414. In step 414, the electronic device may receive at a subsequent position a subsequent beat input. In step 416, it is determined whether the subsequent beat combination is valid and that the action performed between the current and previous beat combination is valid. In instances where it is determined that subsequent beat combination is valid and that the action performed between the current and previous beat combination is also valid, the process may return to step 408, otherwise the process may proceed to step 406.

Figure 4B:
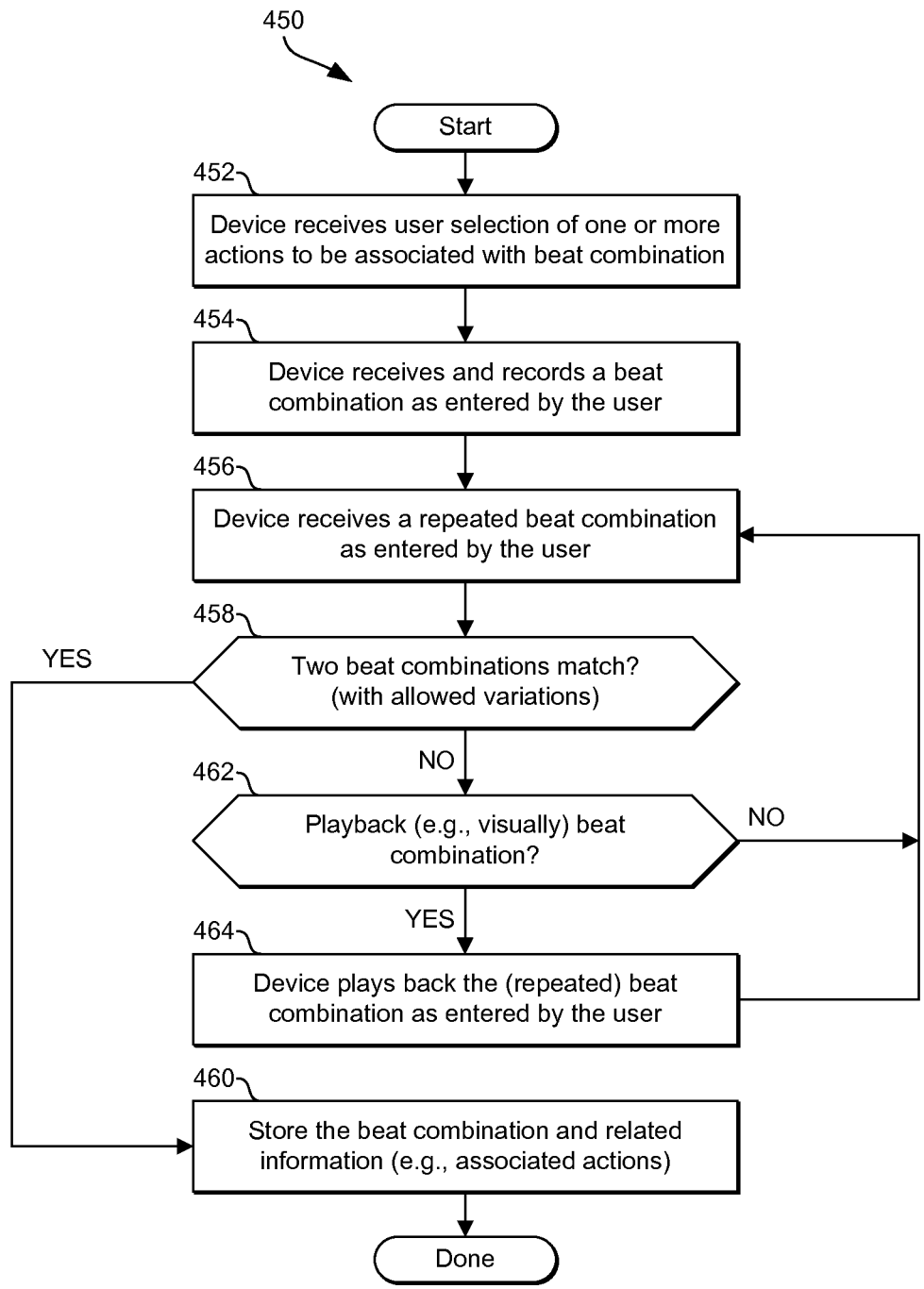
FIG. 4B is a flow chart illustrating configuration of a beat combination that is used in controlling access and/or use of an electronic device.

FIG. 4B is a flow chart illustrating configuration of a beat combination that is used in controlling access and/or use of an electronic device. Referring to FIG. 4B, there is shown a flow chart 450 comprising a plurality of example steps for configuring a beat combination that may be used in controlling access to, and/or use of an electronic device (e.g., device 300) based on beat combinations.

In step 452, the electronic device may receive user selection of one or more actions to be associated with a beat combination. The one or more actions may comprise locking/unlocking the electronic device, and/or executing a particular application or function available therein. In step 454, the electronic device may receive and record a beat combination as entered by the user. For example, once prompted to enter a desired beat combination, the user may enter a particular beat combination comprising a plurality of tapping inputs (each having particular tapping pattern) with particular actions therebetween (e.g., slides, jumps, and/or pauses). In step 456, the electronic device may receive a repeated beat combination as entered by the user. In this regard, the user may be prompted to re-enter the beat combination before it (the beat combination) is accepted. In step 458, it may be determined whether the initially entered beat combination and the re-entered (repeated) beat combination match. In this regard, the comparison may allow for certain measure(s) of acceptable deviation (since it may be difficult for users to precisely replicate duration (e.g., of pauses or taps), or tapping positions. In instances where it is determined that the initially entered beat combination and the re-entered (repeated) beat combination sufficiently match, the process may proceed to step 460. In step 460, the beat combination may be stored, for subsequent use in secure access function (e.g., to be compared with beat combination(s) entered by the user to obtain access to the electronic device).

Returning to step 458, in instances where it is determined that the initially entered beat combination and the re-entered (repeated) beat combination do not sufficiently match, the process may proceed to step 462. In step 462, it may be determined whether to playback the entered (e.g., initial or first) beat combination. The determination to playback a beat combination may be based on user input (e.g., in response to a prompt requesting user preference in this regard) or based on preconfigured control data. In instances where it is determined that no playback of a beat combination is required, the process may return to step 456, and the user may re-enter the beat combination, again (alternatively, configuring the beat combination may be restarted altogether by returning to step 452 or 454). In instances where it is determined that playback of beat combination is required, the process may return to step 464. In step 464 the electronic device may play back the (repeated) beat combination as entered by the user. The process may then return to step 456, to enable the user may re-enter the beat combination (or originally to step 452 or 454 to restart the whole process).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for using beat combinations for controlling electronic devices.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, of operation of an electronic device that includes a presence-sensitive interface, comprising:
   in the electronic device:
      determining access to at least one operation of the electronic device, wherein the at least one operation includes one or more of locking or unlocking the electronic device, triggering an action, initiating or terminating an application, or sending a communication, the determining comprising:
         receiving at a random first location in the presence-sensitive interface, a first tapping input having a first tapping pattern, wherein the presence-sensitive interface is configured to receive the first tapping input at any location of a surface of the presence-sensitive interface;

receiving at a second location in the presence-sensitive interface, a second tapping input having a second tapping pattern;

determining input between the first and the second tapping inputs; and wherein the first tapping pattern and the second tapping pattern each comprise:

a number of taps, with each tap having a particular tap duration; and pauses between consecutive taps; and based on a match of the first tapping input, the second tapping input, and the input between the first and the second tapping inputs with information associated with an access profile, determining to provide the access to the at least one operation.

2. The method of claim 1, wherein the input between consecutive tapping inputs are selected from the group consisting of: pauses, slides, and jumps to locations in the presence-sensitive interface.

3. The method of claim 1, comprising:

comparing the first tapping input, the second tapping input, and the input between the first and second tapping inputs with the information associated with the access profile, wherein the access profile is associated with a user of the electronic device; and determining access to the at least one operation of the electronic device based on the comparison.

4. The method of claim 3, wherein the access profile comprises:

number of expected tapping inputs;

expected input between each consecutive tapping inputs; and expected tapping pattern associated with each expected tapping input, wherein each expected tapping pattern comprises:

a particular number of taps, with each tap having a predefined tap duration; and predefined pauses between consecutive taps.

5. The method of claim 3, comprising configuring or adjusting the access profile based on received input.

6. The method of claim 3, comprising comparing the input between the first and second tapping inputs with corresponding expected input between consecutive tapping inputs included in the access profile.

7. The method of claim 3, comprising allowing for predefined acceptable variations, during the comparing with the access profile, with respect to duration or location of each tap, pauses between consecutive taps, or input between consecutive tapping inputs.

8. The method of claim 7, comprising setting or adjusting one or more of the predefined acceptable variations based on received input.

9. A system, comprising:

an electronic device operable to determine access to operations of the electronic device, wherein the at least one operation includes one or more of locking or unlocking the electronic device, triggering an action, initiating or terminating an application, or sending a communication, the determining comprising:

receiving at a random first location in the presence-sensitive interface, a first tapping input having a first tapping pattern, wherein the presence-sensitive interface is configured to receive the first tapping input at any location of a surface of the presence-sensitive interface;

receiving at a second location in the presence-sensitive interface, a second tapping input having a second tapping pattern;

determining input between the first and the second tapping inputs; and wherein the first tapping pattern and the second tapping pattern each comprise:

a number of taps, with each tap having a tap duration; and pauses between consecutive taps; and wherein the electronic device is configured, based on a match of the first tapping input, the second tapping input, and the input between the first and the second tapping inputs with information associated with an access profile, to provide the access to the at least one operation.

10. The system of claim 9, wherein the input between consecutive tapping inputs is selected from a group consisting of: pauses, slides, and jumps to locations in the presence-sensitive interface.

11. The system of claim 9, wherein the electronic device is operable to compare the received first tapping input, the second tapping input, and the input between the first and second tapping inputs with the information associated with the access profile associated with a user of the electronic device to determine access to the operations of the electronic device.

12. The system of claim 11, wherein the access profile comprises:

number of expected tapping inputs;

expected input between each consecutive tapping inputs; and expected tapping pattern associated with each expected tapping input, wherein each expected tapping pattern comprises:

a particular number of taps, with each tap having a predefined tap duration; and predefined pauses between consecutive taps.

13. The system of claim 11, wherein the electronic device is operable to enable configure or adjust the access profile based on received input.

14. The system of claim 11, wherein the electronic device is operable to compare the input between the first and second tapping inputs with corresponding expected input between consecutive tapping inputs included in the access profile.

15. The system of claim 11, wherein the electronic device is operable to allow for predefined acceptable variations, during the comparing with the access profile, with respect to duration or location of each tap, pauses between consecutive taps, or input between consecutive tapping inputs.

16. The system of claim 15, wherein the electronic device is operable to set or adjust one or more of the predefined acceptable variations based on received input.

17. An electronic device, comprising:

a presence-sensitive interface;

at least one processor; and a memory containing executable instructions that when executed by the at least one processor cause the electronic device to perform a method for controlling operations of the electronic device, wherein the operations include one or more of locking or unlocking the electronic device, triggering an action, initiating or terminating an application, or sending a communication, the method comprising:

determining access to operations of the electronic device based on interactions with the presence-sensitive interface, the determining comprising:

receiving at a random first location in the presence-sensitive interface, a first tapping input having a first tapping pattern, wherein the presence-sensitive interface is configured to receive the first tapping input at any location of a surface of the presence-sensitive interface;

receiving one or more subsequent tapping inputs at corresponding one or more other locations in the presence-sensitive interface, with each subsequent tapping input having a corresponding particular tapping pattern;

determining input between consecutive tapping inputs; and wherein each tapping pattern comprises:
a number of taps, with each tap having a particular tap duration; and
pauses between consecutive taps; and wherein the at least one processor is configured to, based on a match of the first tapping input, the second tapping input, and the input between the first and the second tapping inputs with information associated with an access profile, provide the access to the at least one operation.

18. The electronic device of claim 17, the method for controlling operations further comprising comparing the received first tapping input, the one or more subsequent tapping inputs, and the input between consecutive tapping inputs with the information associated with the access profile associated with a user of the electronic device to determine access to the operations.

19. The electronic device of claim 18, wherein the access profile comprises:
number of expected tapping inputs;
expected input between each consecutive tapping inputs; and
expected tapping pattern associated with each expected tapping input, wherein each expected tapping pattern comprises:
a particular number of taps, with each tap having a predefined tap duration; and
predefined pauses between consecutive taps.

20. The electronic device of claim 18, the method for controlling operations further comprising allowing for predefined acceptable variations, during the comparing with the access profile, with respect to duration or location of each tap, pauses between consecutive taps, or input between consecutive tapping inputs.

21. The electronic device of claim 18, the method for controlling operations further comprising setting or adjusting one or more of the predefined acceptable variations based on received input.

22. A non-transitory machine-readable storage having stored thereon, a computer program having at least one code section for controlling operation of an electronic device that includes a presence-sensitive interface, the at least one code section being executable by a machine for causing the machine to perform steps, comprising:

determining access to at least one operation of the electronic device, wherein the at least one operation includes one or more of locking or unlocking the electronic device, triggering an action, initiating or terminating an application, or sending a communication, the determining comprising:

receiving at a random first location in the presence-sensitive interface, a first tapping input having a first tapping pattern, wherein the presence-sensitive interface is configured to receive the first tapping input at any location of a surface of the presence-sensitive interface;

receiving at a second location in the presence-sensitive interface, a second tapping input having a second tapping pattern;

determining input between the first and the second tapping inputs; and wherein the first and second tapping patterns each comprise:
a number of taps, with each tap having a particular tap duration; and
pauses between consecutive taps; and based on a match of the first tapping input, the second tapping input, and the input between the first and the second tapping inputs with information associated with an access profile, determining to provide the access to the at least one operation.

23. The non-transitory machine-readable storage of claim 22, wherein the at least one code section comprises code for comparing the first tapping input, the second tapping input, and the input between the first and second tapping inputs with information associated with the access profile associated with a user of the electronic device to determine access to the at least one operation of the electronic device.

24. The non-transitory machine-readable storage of claim 23, wherein the access profile comprises:
number of expected tapping inputs;
expected input between each consecutive tapping inputs; and
expected tapping pattern associated with each expected tapping input, wherein each expected tapping pattern comprises:
a particular number of taps, with each tap having a predefined tap duration; and
predefined pauses between consecutive taps.

25. The non-transitory machine-readable storage of claim 23, wherein the at least one code section comprises code for configuring or adjusting the access profile based on received input.

26. The non-transitory machine-readable storage of claim 23, wherein the at least one code section comprises code for comparing the input between the first and second tapping inputs with corresponding expected input between each consecutive tapping inputs included in the access profile.

27. The non-transitory machine-readable storage of claim 23, wherein the at least one code section comprises code for allowing for predefined acceptable variations, during the comparing with the access profile, with respect to duration or location of each tap, pauses between consecutive taps, or input between consecutive tapping inputs.

28. The non-transitory machine-readable storage of claim 27, wherein the at least one code section comprises code for setting or adjusting one or more of the predefined acceptable variations based on received input.

* * * * *